(12) United States Patent
Fowers et al.

(10) Patent No.: US 11,556,762 B2
(45) Date of Patent: Jan. 17, 2023

(54) NEURAL NETWORK PROCESSOR BASED ON APPLICATION SPECIFIC SYNTHESIS SPECIALIZATION PARAMETERS

(71) Applicant: Microsoft Technology Licensing, LLC, Redmond, WA (US)

(72) Inventors: Jeremy Fowers, Seattle, WA (US); Kalin Ovtcharov, Issaquah, WA (US); Eric S. Chung, Woodinville, WA (US); Todd Michael Massengill, Woodinville, WA (US); Ming Gang Liu, Kirkland, WA (US); Gabriel Leonard Weisz, Bethesda, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1190 days.

(21) Appl. No.: 15/959,206

(22) Filed: Apr. 21, 2018

(65) Prior Publication Data

US 2019/0325296 A1 Oct. 24, 2019

(51) Int. Cl.
*G06N 3/063* (2006.01)
*G06F 15/80* (2006.01)

(52) U.S. Cl.
CPC ......... *G06N 3/063* (2013.01); *G06F 15/8053* (2013.01)

(58) Field of Classification Search
CPC .... G06N 3/063; G06N 3/0445; G06N 3/0454; G06F 15/8053; G06F 17/16
See application file for complete search history.

(56) References Cited

U.S. PATENT DOCUMENTS

| 9,710,265 | B1 | 7/2017 | Temam et al. |
| 10,943,039 | B1* | 3/2021 | Sirasao ................ G06F 30/34 |
| 11,182,666 | B1* | 11/2021 | Phebus ............ H03K 19/17728 |
| 2018/0322607 | A1* | 11/2018 | Mellempudi .......... G06F 17/16 |
| 2019/0179635 | A1* | 6/2019 | Jiao ..................... G06F 17/153 |
| 2019/0205746 | A1* | 7/2019 | Nurvitadhi .......... G06N 3/0454 |

(Continued)

FOREIGN PATENT DOCUMENTS

| CN | 107516131 A | 12/2017 | |
| WO | WO-2018144534 A1 * | 8/2018 | ............. G06F 17/16 |

OTHER PUBLICATIONS

"Lu, Evaluating Fast Algorithms for Convolutional Neural Networks on FPGAs" (Year: 2017).*

(Continued)

*Primary Examiner* — Benjamin P Geib
(74) *Attorney, Agent, or Firm* — Ranjeev Singh; Singh Law, PLLC

(57) ABSTRACT

Neural network processors that have been customized based on application specific synthesis specialization parameters and related methods are described. Certain example neural network processors and methods described in the present disclosure expose several major synthesis specialization parameters that can be used for specializing a microarchitecture instance of a neural network processor to specific neural network models including: (1) aligning the native vector dimension to the parameters of the model to minimize padding and waste during model evaluation, (2) increasing lane widths to drive up intra-row-level parallelism, or (3) increasing matrix multiply tiles to exploit sub-matrix parallelism for large neural network models.

18 Claims, 10 Drawing Sheets

(56) References Cited

U.S. PATENT DOCUMENTS

2020/0159534 A1* 5/2020 Li .................. G06N 3/0454
2020/0380344 A1* 12/2020 Lie .................. G06N 3/063

OTHER PUBLICATIONS

Chung, et al., "Accelerating Persistent Neural Networks at Datacenter Scale", Retrieved from https://www.hotchips.org/wp-content/uploads/hc_archives/hc29/HC29.22-Tuesday-Pub/HC29.22.60-NeuralNet1-Pub/HC29.22,622-Brainwave-Datacenter-Chung-Microsoft-2017_08_11_2017.pdf, Aug. 1, 2017, 52 Pages.

Chung, et al., "Serving DNNs in Real Time at Datacenter Scale with Project Brainwave", In Proceedings of IEEE Micro, vol. 38, Issue 2, Apr. 20, 2018, 11 Pages.

Das, et al., "Mixed Precision Training of Convolutional Neural Networks using Integer Operations", Published as a Conference Paper at ICLR, Feb. 3, 2018, 11 Pages.

Burger, Doug, "Microsoft Unveils Project Brainwave for Real-Time AI", Retreived from https://www.microsoft.com/en-us/research/blog/microsoft-unveils-project-brainwave/, Aug. 22, 2017, 7 Pages.

Fowers, et al., "A Configurable Cloud-Scale DNN Processor for Real-Time AI", In Proceedings of the ACM/IEEE 15th Annual International Symposium on Computer Architecture, Jun. 2, 2018, 14 Pages.

"International Search Report and Written Opinion Issued in PCT Application No. PCT/US2019/026204", dated Jul. 3, 2019, 17 Pages.

Song, et al., "Computation Error Analysis of Block Floating Point Arithmetic Oriented Convolution Neural Network Accelerator Design", In 32nd AAAI Conference on Artificial Intelligence, Sep. 22, 2017, 8 Pages.

Farabet, et al., "Cnp: An Fpga-Based Processor for Convolutional Networks", In Proceedings of IEEE International Conference on Field Programmable Logic and Applications, FPL, Aug. 31, 2009, 6 Pages.

He, et al., "Deep Residual Learning For Image Recognition", In Journal of the Computing Research Repository, Dec. 10, 2015, pp. 1-12.

Yiannacouras, et al., "VESPA: Portable, Scalable, and Flexible FPGA-Based Vector Processors", In Proceedings of the International Conference on Compilers, Architectures and Synthesis for Embedded Systems, Oct. 19, 2008, 10 Pages.

Yu, et al., "Vector Processing as a Soft-core CPU Accelerator", In Proceedings of the 16th International Symposium on Field Programmable Gate Arrays, Feb. 24, 2008, 10 Pages.

Morgan, Timothy Prickett, "Drilling into Microsoft's BrainWave Soft Deep Learning Chip", Retrieved from https://www.nextplatform.com/2017/08/24/drilling-microsofts-brainwave-soft-deep-leaning-chip/, Aug. 24, 2017, 18 Pages.

* cited by examiner

NEURAL NETWORK PROCESSOR BASED ON APPLICATION SPECIFIC SYNTHESIS SPECIALIZATION PARAMETERS

BACKGROUND

Neural network technology is used to perform complex tasks such as reading comprehension, language translation, image recognition, or speech recognition. Machine learning services, such as those based on Recurrent Neural Networks (RNNs), Convolution Neural Networks (CNNs), Long Short Term Memory (LSTM) neural networks, or Gated Recurrent Units (GRUs) have been deployed to perform such complex tasks. While these types of neural networks have been deployed, there is a need for continued improvement in the underlying architecture and corresponding instructions to perform these complex tasks.

SUMMARY

In one example, the present disclosure relates to a method, implemented by a processor, for synthesizing a neural network processor comprising a plurality of tile engines, where each of the plurality of tile engines is configured to process matrix elements and vector elements. The method may include using the processor analyzing a neural network model corresponding to an application to determine: (1) a first minimum number of units required to express a shared exponent value required to satisfy a first precision requirement corresponding to each of the matrix elements and corresponding to each of the vector elements, (2) a second minimum number of units required to express a first mantissa value required to satisfy a second precision requirement corresponding to the each of the matrix elements, and (3) a third minimum number of units required to express a second mantissa value required to satisfy a third precision requirement corresponding to the each of the vector elements.

The method may further include obtaining code representative of at least a portion of at least one hardware node for implementing the neural network processor. The method may further include obtaining a synthesis model comprising a plurality of synthesis specialization parameters including: (1) a first synthesis specialization parameter corresponding to a first native dimension of the each of the matrix elements, (2) a second synthesis specialization parameter corresponding to a second native dimension of the each of the vector elements, and (3) a third synthesis specialization parameter corresponding to a number of the plurality of tile engines, where each of a first value corresponding to the first synthesis specialization parameter, a second value corresponding to the second synthesis specialization parameter, and a third value corresponding to the third synthesis specialization parameter is selected to meet or exceed a performance metric associated with the at least one hardware node.

The method may further include using the processor modifying the code, based on at least the first minimum number of units, the second minimum number of units, the third minimum number of units and at least the first value and the second value, to generate a modified version of the code and storing a modified version of the code.

In another example, the present disclosure relates to a system comprising a processor and a memory comprising: (1) code representative of at least a portion of at least one hardware node for implementing the neural network processor comprising a plurality of tile engines, where each of the plurality of tile engines is configured to process matrix elements and vector elements, (2) a synthesis model comprising a plurality of synthesis specialization parameters including: (a) a first synthesis specialization parameter corresponding to a first native dimension of the each of the matrix elements and, (b) a second synthesis specialization parameter corresponding to a second native dimension of the each of the vector elements, and (c) a third synthesis specialization parameter corresponding to a number of the plurality of tile engines, where each of a first value corresponding to the first synthesis specialization parameter, a second value corresponding to the second synthesis specialization parameter, and a third value corresponding to the third synthesis specialization parameter is selected to meet or exceed a performance metric associated with the at least one hardware node, and (3) instructions for synthesizing a neural network processor comprising a plurality of tile engines, where each of the plurality of tile engines is configured to process matrix elements and vector elements.

The instructions may be configured to using the processor analyze a neural network model corresponding to an application to determine: (1) a first minimum number of units required to express a shared exponent value required to satisfy a first precision requirement corresponding to each of the matrix elements and corresponding each of the vector elements, (2) a second minimum number of units required to express a first mantissa value required to satisfy a second precision requirement corresponding to the each of the matrix elements, and (3) a third minimum number of units required to express a second mantissa value required to satisfy a third precision requirement corresponding to the each of the vector elements.

The instructions may further be configured to using the processor modify the code, based on at least the first minimum number of units, the second minimum number of units, the third minimum number of units and at least the first value, the second value, and the third value, to generate a modified version of the code and store a modified version of the code.

In yet another example, the present disclosure relates to a method for synthesizing a neural network processor comprising a plurality of tile engines, where each of the plurality of tile engines is configured to process matrix elements and vector elements, and where each of the plurality of tile engines comprises a plurality of dot product units and where each of the dot product units is configured to receive the matrix elements from a matrix register file.

The method may include using the processor analyzing a neural network model corresponding to an application to determine: (1) a first minimum number of units required to express a shared exponent value required to satisfy a first precision requirement corresponding to each of the matrix elements and corresponding to each of the vector elements, (2) a second minimum number of units required to express a first mantissa value required to satisfy a second precision requirement corresponding to the each of the matrix elements, and (3) a third minimum number of units required to express a second mantissa value required to satisfy a third precision requirement corresponding to the each of the vector elements.

The method may further include obtaining code representative of at least a portion of at least one hardware node for implementing the neural network processor. The method may further include obtaining a synthesis model comprising a plurality of synthesis specialization parameters including: (1) a first synthesis specialization parameter corresponding to whether the matrix register file is private to each one of the plurality of tile engines or whether the matrix register file is shared among the plurality of tile engines and (2) a second synthesis specialization parameter corresponding to whether each of the plurality of dot product units comprises an add-reduction tree.

The method may further include using the processor modifying the code, based on at least the first minimum number of units, the second minimum number of units, the third minimum number of units and at least the first synthesis specialization parameter and the second synthesis specialization parameter, and storing a modified version of the code.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
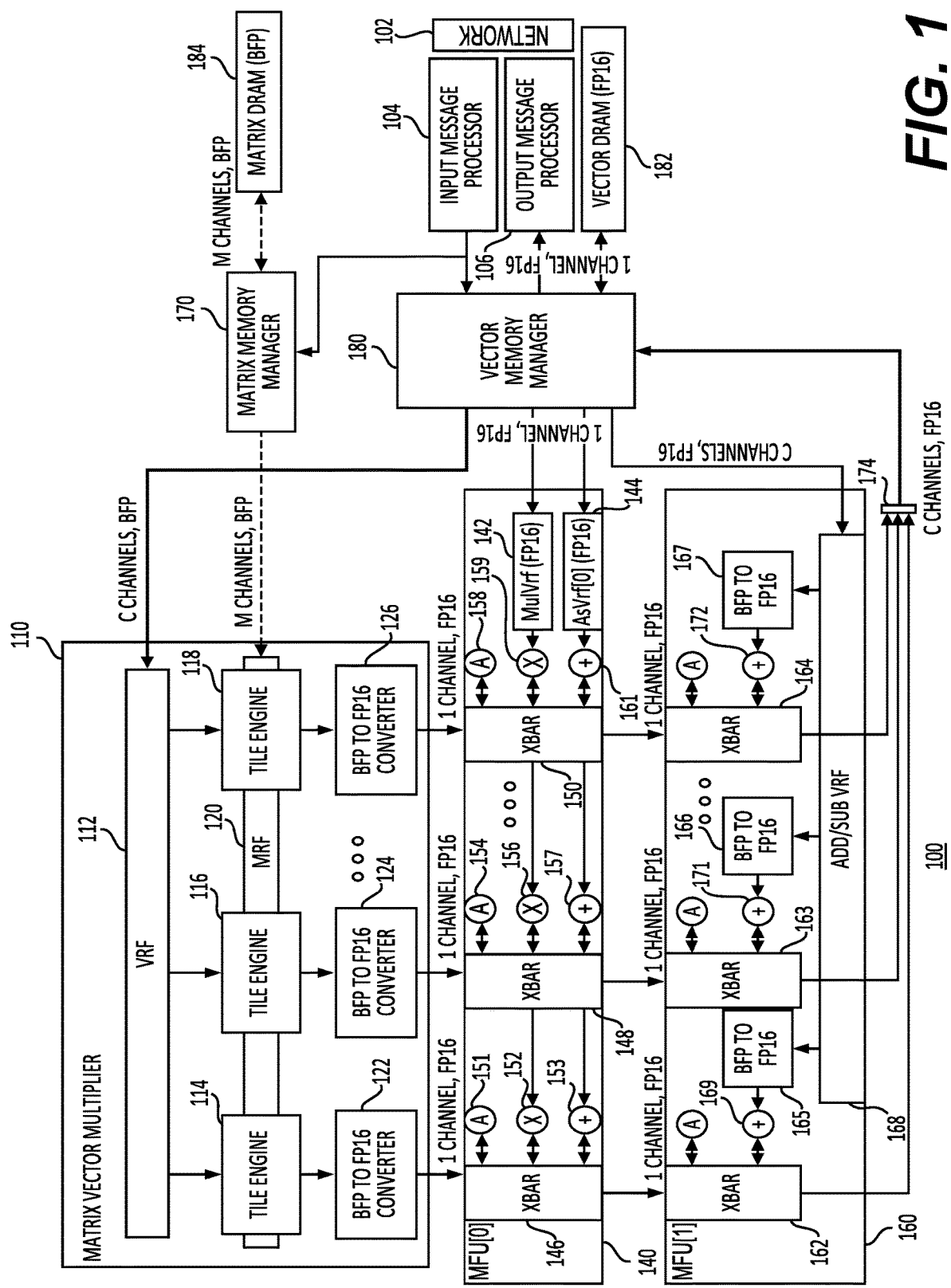
FIG. 1 is a block diagram of a neural network processor in accordance with one example.

Examples disclosed in the present example relate to neural network processors that have been customized based on application specific synthesis specialization parameters. Certain example neural network processors described in the present disclosure expose several major parameters that can be used for specializing a microarchitecture instance of a neural network processor to specific models including: (1) aligning the native vector dimension to parameters of the model tends to minimize padding and waste during model evaluation, (2) increasing lane widths can be used to drive up intra-row-level parallelism, and (3) increasing matrix multiply tiles that can exploit sub-matrix parallelism for large models.

In addition, certain examples of neural network processors described in the present disclosure employ a narrow precision block floating point (BFP) format that shares exponents across groups of floating point numbers at the native vector level. In these examples, using a narrow form of BFP, mantissas could be trimmed to as low as 2-3 bits without negatively impacting the accuracy of model training of deep neural networks (DNN) models and large ImageNet models (e.g., ResNet-50). With shared exponents, the cost of implementing floating point format-based computations may drop to similar levels as the cost of implementing fixed integer arithmetic. As part of the synthesis specialization for FPGA-based neural network processors, narrow precision may be further exploited. As an example, packing 2 or 3 bit multiplications into DSP blocks combined with soft logic instantiations may permit the deployment of a large number of multiply-accumulate (MAC) units on an FPGA.

Convolutional Neural Networks (CNNs) and Recurrent Neural Networks (RNNs) are both widely used computational kernels in mainstream machine learning. CNNs and RNNs may be efficiently expressed in terms of matrix-vector multiplication, however the parallelism and data structures inherent to each differs significantly. Therefore, it is challenging to produce a single tera-flop scale computer architecture that efficiently computes both CNNs and RNNs This problem is compounded when real time latency requirements are placed on the design. As a result, previous solutions have specialized for CNNs or RNNs without prioritizing strong performance on both. Certain examples disclosed in the present disclosure relate to using system, methods, and components that provide for efficient computation for both CNNs and RNNs.

As an example, the present disclosure describes a neural network processor that leverages the parallelism between individual output activations in a CNN to perform a limited form of matrix-matrix multiplication within an individual CNN evaluation. This parallelism is mapped onto a circuit in the form of an array of quasi-independent matrix-vector multiplication tile engines that receive the same matrix data but different vector data. This approach allows for high utilization at batch=1 for CNN inputs, which in turn delivers high throughput at low latency. One of the ways to enable this approach is the use of a multi-port vector register file (VRF), which allows many simultaneous vectorized reads and writes to a shared memory space. This approach is also enabled by a CNN-aware instruction set architecture (ISA) that provides an information-dense expression of CNNs in the same assembly level code that can be used to express RNNs.

The neural network processors described in this disclosure may be implemented using portions or combinations of Field Programmable Gate Arrays (FPGAs), Application Specific Integrated Circuits (ASICs), Erasable and/or Complex programmable logic devices (PLDs), Programmable Array Logic (PAL) devices, and Generic Array Logic (GAL) devices. An image file may be used to configure or reconfigure the neural network processors, such as FPGAs. The image file or similar file or program may be delivered via a network link or a local link (e.g., PCIe) from a host CPU. Information included in an image file can be used to program hardware blocks of a neural network processor (e.g., logic blocks and reconfigurable interconnects of an FPGA) to implement desired functionality. Desired functionality can be implemented to support any service that can be offered via a combination of computing, networking, and storage resources such as via a data center or other infrastructure for delivering a service.

In one example, neural network processors (e.g., FPGAs) or groups of such neural network processors may be coupled to each other via a low latency network. A converged platform leveraging hundreds to thousands of such neural network processors (e.g., FPGAs) may advantageously offer: (1) significantly reduced training times from exploiting parallelism across hundreds of thousands of nodes, (2) enabling new training scenarios such as online learning in-situ on live data, and (3) training models of unprecedented scale while leveraging flexible and fungible homogeneous FPGA resources in a hyper-scale datacenter spanning hundreds of thousands of servers. In one example, such advantages may be obtained by exploiting unconventional data representations that may leverage the architecture of neural network processors, such as FPGAs.

The described aspects can also be implemented in cloud computing environments. Cloud computing may refer to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model may be used to expose various service models, such as, for example, Hardware as a Service ("HaaS"), Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

Machine learning services, such as those based on Recurrent Neural Networks (RNNs), Convolution Neural Networks (CNNs), Long Short Term Memory (LSTM) neural networks, or Gated Recurrent Units (GRUs) may be implemented using the neural network processors described in this disclosure. In one example, the service-related content or other information, such as words, sentences, images, videos, or other such content/information may be translated into a vector representation. The vector representation may correspond to techniques such as RNN, CNN, LSTM, or GRU. The deep learning models may be trained off-line before service initialization and then may be deployed using the systems and neural network processors described in this disclosure.

In one example, the neural network model may comprise of many layers and each layer may be encoded as matrices or vectors of weights expressed in the form of coefficients or constants that have been obtained via off-line training of a neural network. Programmable hardware logic blocks in the nodes may process the matrices or vectors to perform various operations, including multiply, add, and other operations against input vectors representing encoded information related to the service. In one example, the matrices or vectors of weights may be partitioned and pinned across multiple nodes by using techniques such as graph partitioning. As part of this process, a large neural network may be translated into an intermediate representation (e.g., a graph) and then the intermediate representation may be carved into smaller representations (e.g., sub-graphs) and each of the matrices of weights corresponding to each sub-graph may be pinned to a node's on-chip memories. In one example, the models may be translated into fixed-size matrices and vectors. This way, the nodes' resources may operate on the fixed-size matrices and vectors in parallel.

Taking the LSTM example, an LSTM network may comprise a sequence of repeating RNN layers or other types of layers. Each layer of the LSTM network may consume an input at a given time step, e.g., a layer's state from a previous time step, and may produce a new set of outputs or states. In case of using the LSTM, a single chunk of content may be encoded into a single vector or multiple vectors. As an example, a word or a combination of words (e.g., a phrase, a sentence, or a paragraph) may be encoded as a single vector. Each chunk may be encoded into an individual layer (e.g., a particular time step) of an LSTM network. An LSTM layer may be described using a set of equations, such as the ones below:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} i_t \tan h(W_{xc}x_t + W_{hc}h_{t-1} + b_c)$$

$$o_t = \sigma(W_{xo}x_t + W_{ho}h_{t-1} + W_{co}c_t + b_o)$$

$$h_t = o_t \tan h(c_t)$$

In this example, inside each LSTM layer, the inputs and hidden states may be processed using a combination of vector operations (e.g., dot-product, inner product, or vector addition) and non-linear functions (e.g., sigmoids, hyperbolic, and tangents). In certain cases, the most compute intensive operations may arise from the dot products, which may be implemented using dense matrix-vector and matrix-matrix multiplication routines. In one example, the processing of the vector operations and non-linear functions may be performed in parallel.

In one example, individual neural network processors may send messages comprising packets directly to each other and thus this may allow the partitioning of even a single neural network across multiple neural network processors without incurring unacceptable latencies. For communicating the neural network processors may use a lightweight protocol, including, for example, RDMA. Parallelization could also be performed within a layer of a neural network by splitting neural weights across multiple neural network processors. As an example, a single CNN or RNN model (e.g., including LSTM weight matrices) may be partitioned and processed using neural network processors.

FIG. 1 is a block diagram of a neural network processor 100 in accordance with one example. Each neural network processor 100 may include an Input Message Processor (IMP) 104 for receiving messages from other processors and an Output Message Processor (OMP) 106 for processing outgoing messages to other processors or components. Such messages may be received and transmitted via network 102. Each neural network processor 100 may further include a matrix vector multiplier (MVM) 110 and two or more multifunction units (MFUs) (e.g., MFU[0] 140 and MFU[1] 160). Each neural network processor 100 may further include a matrix memory manager 170, a vector memory manager 180, a Vector DRAM 182, and a Matrix DRAM 184. In this example, the processor may accept off-chip messages containing auxiliary information such as control and scalar data and payload data (e.g., vectors, matrices, or other tensor data structures). In this example, the incoming messages may be handled by a lightweight input message processor (IMP) 104, which sends the vectors to vector memory manager 180. IMP 104 may send the matrices to matrix memory manager 170.

With continued reference to FIG. 1, each of the matrices may have an N by N size and each of the vectors may have a size of 1 by N. In this example, all instructions corresponding to neural network processor 100 may operate on native-sized data. Logical vectors and matrices corresponding to the applications handled by neural network processor 100 may often be larger than the native size; in these cases, the vectors and matrices are broken up into native-sized tiles. In one example, for matrix vector multiplication, matrix data and vector data may be expressed in block floating point (BFP) format. In this example, the block size of the BFP format data may be equal to the native dimension. Therefore, each native 1 by N vector may have a shared exponent, and each row of an N by N matrix may have a shared exponent. Each of the vector data and the matrix data may have a two's complement mantissa portion, and the mantissa size for the vector data and the matrix data may be different.

MVM 110 may include a vector register file (VRF) 112, a matrix register file (MRF) 120, and tile engines (e.g., tile engines 114, 116, and 118). Tile engines may receive input matrix and input vector data from VRF 112. MVM 110 may further include format converters, as needed, including block floating point (BFP) to floating point (FP) converters. In one example, two internal BFP formats may be used by MVM 110 for expressing its input and output: BFP short, for vector and matrix storage, and BFP long for accumulation. In one example of MVM 110, BFP short may use q1.15 fixed point values with a shared 5 bit exponent, and BFP long may use q34.40 fixed point values with a shared 5 bit exponent. In this example, the matrix-vector multiplication may result in BFP long, which may be converted back to a floating-point format as a final output stage. Thus, the example MVM 110 shown in FIG. 1 may include BFP to FP16 Converters 122, 124, and 126 at the output stages. Tile engines 114, 116, and 118 may, in parallel, provide outputs to the respective converters as shown in the example in FIG. 1. Additional details regarding MVM 110 are provided in FIG. 2 and additional details of VRF 112 are provided in FIGS. 3 and 4.

The matrix data may be communicated between Matrix DRAM 184 and Matrix Memory manager 170 using M number of channels. Vector memory manager may move vector data to over C number of channels.

With continued reference to FIG. 1, each MFU (e.g., MFU[0] 140 and MFU[1] 160) may include crossbars (e.g., crossbars labeled as xbars). MFU[0] 140 may support vector operations, such as vector-vector multiply and addition, a Sigmoid function, a Tan H function, a softmax operation, a Rectified Linear Unit (ReLU) operation, and/or an activation block operation. Thus, as shown in FIG. 1, MFU[0] 140 may include crossbars (e.g., xbar 146, 148, and 150) that may stream a vector from its input bus through a pipelined sequence of operations. Thus, a vector may be received via a register file labeled MulVrf 142 or another register file labeled AsVrf[0] 144, and such vectors may be subjected to any of a multiply operation, an addition operation, or some other operation. MFU[0] 140 may include several hardware blocks for performing addition (e.g., 153, 157, and 161). MFU[0] 140 may also include several hardware blocks for performing multiplication (e.g., 152, 156, and 159). MFU[0] 140 may also include several hardware blocks for performing activation (e.g., 151, 154, and 158).

Still referring to FIG. 1, MFU[1] 160 may include crossbars (e.g., xbar 162, 163, and 164) that may allow MFU[1] 160 to receive outputs from MFU[0] 140 and perform additional operations on those outputs and any additional inputs received via ADD/SUB VRF 168. MFU[1] 160 may include several hardware blocks for performing addition (e.g., 169, 171, and 172). MFU[1] 160 may also include several hardware blocks for performing activation. The outputs from MFU[1] 160 received via C channels may be coupled via a multiplexing circuit 174 to vector memory manager 180. Although FIG. 1 shows a certain number of components of neural network processor 100 arranged in a certain manner, there could be more or fewer number of components arranged differently.

Neural network processor 100 may be used to enable issuance of instructions that can trigger millions of operations using a small number of instructions. As an example, Table 1 below shows instructions corresponding to a fully parameterized LSTM:

TABLE 1

```
void LSTM (int steps) {
    for (int t = 0; t < steps; t++) {
        v_rd (s , NeqQ, DONTCARE) ;
        v_wr (s , InitialVrf, 1stm → ivrf_xt) ;
        // xWF = xt * Wf + bf
        v_rd (s, InitialVrf , 1stm → ivrf_xt);
        mv_mul (s , 1stm → mrf_Wf) ;
        vv_add (s , 1stm → asvrf_bf) ;
        v_wr (s , AddSubVrf , 1stm → asvrf_xWf) ;
        // xWi = xt * Wi + bi ...
        // xWf = xt * Wo + bo ...
        // xWc = xt * Wc + bc ...
        // f gate → multiply by c_prev
        v_rd (s , InitialVrf , 1stm → ivrf_h_prev) ;
        mv_mul (s , 1stm → mrf_Uf) ;
        vv_add (s , 1stm → asvrf_xWf) ;
        v_sigm (s) ; // ft
        vv_mul (s , 1stm → mulvrf_c_prev) ;
        v_wr (s , AddSubVrf , 1stm → asvrf_ft_mod) ;
        // i gate ...
        // o gate ...
        // c gate → store ct and c_prev
        v_rd (s , InitialVrf , 1stm → ivrf_h_prev) ;
        mv_mul (s , 1stm → mrf_Uc) ;
        vv_add (s , 1stm → asvrf_xWc) ;
        v_tanh (s) ;
        vv_mul (s , 1stm → mulvrf_it) ;
        vv_add (s , 1stm → asvrf_ft_mod) ; // ct
        v_wr (s , MultiplyVrf , 1stm → mulvrf_c_prev) ;
        v_wr (s , InitialVrf, 1stm → ivrf_ct) ;
        // produce ht, store and send to network
        v_rd (s , InitialVrf , 1stm → ivrf_ct) ;
        v_tanh (s) ;
        vv_mul (s , 1stm → mulvrf_ot) ; // ht
        v_wr (s , InitialVrf, 1stm → ivrf_h_prev) ;
        v_wr (s , NetQ , DONTCARE) ;
    }
}
```

Although Table 1 shows a certain number of instructions having a certain format, neural network processor 100 may execute more or fewer instructions having a different format to accomplish the same objectives.

Table 2 below shows how to compute a 1×1 convolution as part of a CNN evaluation.

TABLE 2

SetIterations(bs, args->iterations);
SetRowsCols(bs, 1, args->cols);

TABLE 2-continued

```
// Compute
v_rd_inc(bs, ISA_Mem_MvmInitialVrf, mvuivrf_input, args->cols);
mv_mul(bs, mrf_weights);
vv_add_inc(bs, ISA_Mem_AddSubVrf_0, asvrf0_bias, 0);
vv_add_inc(bs, ISA_Mem_AddSubVrf_1, asvrf1_residual, 1);
v_relu(bs);
v_wr_inc(bs, ISA_Mem_NetOutputQ, DONTCARE, DONTCARE).
```

As shown in the table above, the number of iterations over a chain of instructions for the computation may be specified. Next, as needed, the native dimension of each instruction chain may be scaled by a column scaling factor. And after reading the vector data from the vector register file it may be multiplied with the weights retrieved from the matrix register file. After performing additional operations as required by the CNN evaluation, the output may be provided. As an example, a pointwise Rectified Linear Unit (ReLU) operation may be performed for each element of the vector data.

Table 3 below shows how to compute an N×N convolution as part of a CNN evaluation. The instructions below that are similar to the 1×1 convolution are not described again. The Set2dWindows instruction may be used to set the total window size and then SetIterations instruction may be used to slide that window across the input volume. The *_inc instructions (e.g., v_rd_inc and v_add_inc) may be used to increment the instruction's address based on the stride. As an example, a stride of 2 may result in skipping of every other vector in the vector register file that is used to store vector data for operations, such as addition.

TABLE 3

```
SetRowsCols(bs, 1, args->windowCols * args->windowCols * args-
>volumeDepth);
Set2dWindow(bs, args->windowCols * args->volumeDepth, input_cols);
SetIterations(bs, output_cols);
for (unsigned imageRow = 0; imageRow < output_rows; imageRow++)
{
    for (unsigned filter = 0; filter < args->filterCount; filter++)
    {
       v_rd_inc(bs, ISA_Mem_MvmInitialVrf, ivrf_input + imageRow *
args->windowStride * input_cols, args->volumeDepth * args-
>windowStride);
       mv_mul(bs, mrf_weights + filter * args->windowCols * args-
>windowCols * args->volumeDepth);
       vv_add_inc(bs, ISA_Mem_AddSubVrf_0, asvrf0_bias + filter, 0);
       v_relu(bs);
       v_wr_inc(bs, ISA_Mem_Dram, dram_buffer_wr_ptr + filter,
output_depth);
    }
    dram_buffer_wr_ptr+= output_cols * output_depth;
}
```

Figure 2:
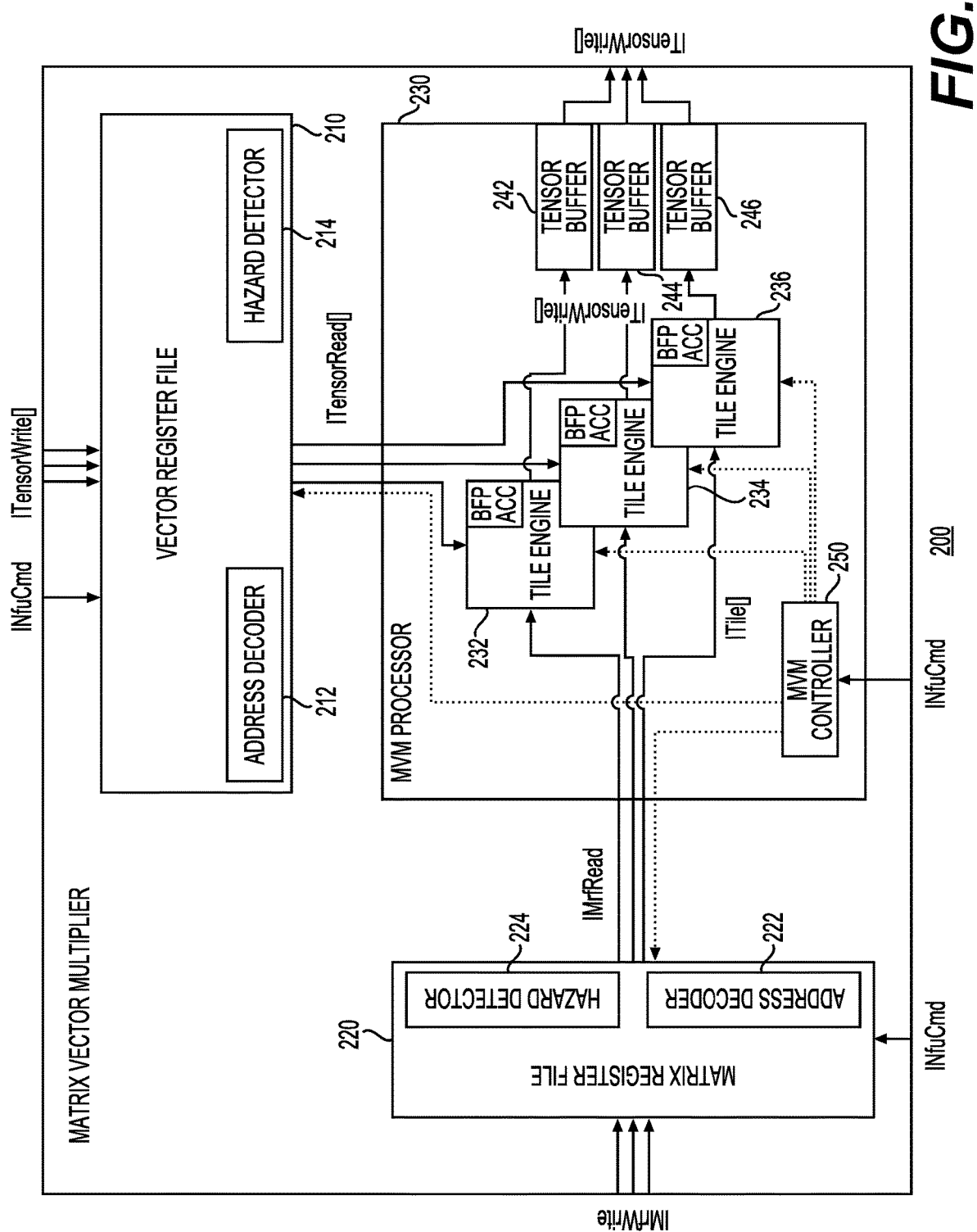
FIG. 2 is a block diagram of a matrix-vector multiplier (MVM) in accordance with one example.

FIG. 2 is a block diagram of a matrix-vector multiplier (MVM) 200 in accordance with one example. In this example, MVM 200 may be used to implement MVM 110 of FIG. 1. MVM 200 may include a vector register file (VRF) 210, a matrix register file (MRF) 220, and an MVM processor 230. VRF 210 may further include an address decoder 212 and a hazard detector 214. VRF 210 may receive both commands and vector data, such as tensors. MRF 220 may include an address decoder 222 and a hazard detector 224. MRF 220 may receive both commands and matrix data. MVM processor 230 may include tile engines 232, 234, and 236. MVM processor 230 may also include buffers for receiving and providing tensors (e.g., tensor buffers 242, 244, and 246). MVM processor 230 may further include an MVM controller 250. In this example, MVM 200 may instantiate a series of tile engines, each of which may be designed to accelerate a native-sized MVM. In this example, each tile engine is made up of a series of dot product units (DPUs), such that each dot product unit may be responsible for the dot product computation that corresponds to one native row in the matrix tile. In one example, when neural network processor 100 is implemented using an FPGA, a small set of BRAMs and DSPs may be configured to create a tile engine. As an example, each may include block random-access memories (BRAMs) and processing logic blocks (e.g., digital signal processors (DSPs)). Processing logic blocks may be used to multiply an input vector with a row of weights. The output of processing logic blocks may be added using an adder. Thus, in this example, each tile may perform a point-wise dot product operation. The dot product units may be composed of lanes of parallel multipliers that may feed into an accumulation tree. These lanes may provide parallelism within the columns of a row of a matrix tile. In this manner, MVM 200 may exploit at least four dimensions of parallelism: inter-MVM, MVM tiling, across the rows of a tile, and within the columns of the row.

MRF 220 may include several matrix register files that may be configured to supply matrix data or elements to dot product units within each tile. Each multiplier may receive one vector element from VRF 210 per cycle and one matrix element from one of the matrix register files per cycle. The matrix elements may be delivered by a dedicated port of the matrix register file positioned adjacent to that multiplier. MRF 220 may be organized as follows: stored matrices may be divided into native-sized tiles and each tile may be stored in only a single tile engine. The matrix stored in a given tile engine may be viewed as an MRF bank. Each dot product unit may be associated with a sub-bank of the MRF that holds one row of each matrix tile in that MRF bank. Rows may be statically assigned to dot product units, such that the first dot product unit contains the first row of every matrix tile in the MRF bank. Finally, the elements of the row may be interleaved in an SRAM such that the SRAM read port can be directly connected to multiplier lanes by wires alone. The writes to the matrix register file may be handled differently since matrix data for writing to MRF 220 may come from off-chip memory, such as DRAM. Although FIG. 2 shows a certain number of components of MVM 200 arranged in a certain manner, there could be more or fewer number of components arranged differently.

From an operational point of view, as described above, MVM 200 instantiates a series of matrix-vector tiles, each of which are designed to accelerate a native-sized MVM. In turn, each tile engine includes a series of dot product engines. In one example, this may be accomplished using a hierarchical decode and dispatch architecture. Thus, in a case where neural network processor 100 is implemented based on an FPGA, a control processor may be realized using an off-the-shelf Nios II/f processor that is paired with custom code. A top-level scheduler associated with the control processor may receive a stream of instructions that may be grouped in chains. After decoding the instructions, the top-level scheduler may dispatch distributed control signals to a set of second-level schedulers and to another set of second-level decoders. These second-level schedulers and decoders may dispatch additional distributed control signals to the lowest level decoders. In the example implementation using the Nios processor, the Nios processor may stream T iterations of N instructions into the top-level scheduler. Next, the top-level scheduler may dispatch the MVM-specific portion of instructions to a second-level scheduler, which may expand operations along the target matrix's N rows and N columns. These MVM schedules may be mapped to matrix-vector tile engines and the operations may be dispatched to a set of decoders each for the tile engines and their associated vector register files and accumulation units. The set of decoders may generate control signals that fan out into the data plane, with each tile engine dispatcher fanning out to hundreds of dot product units that may read the vector data from the vector register file and write the vector data back to the vector register file.

Figure 3:
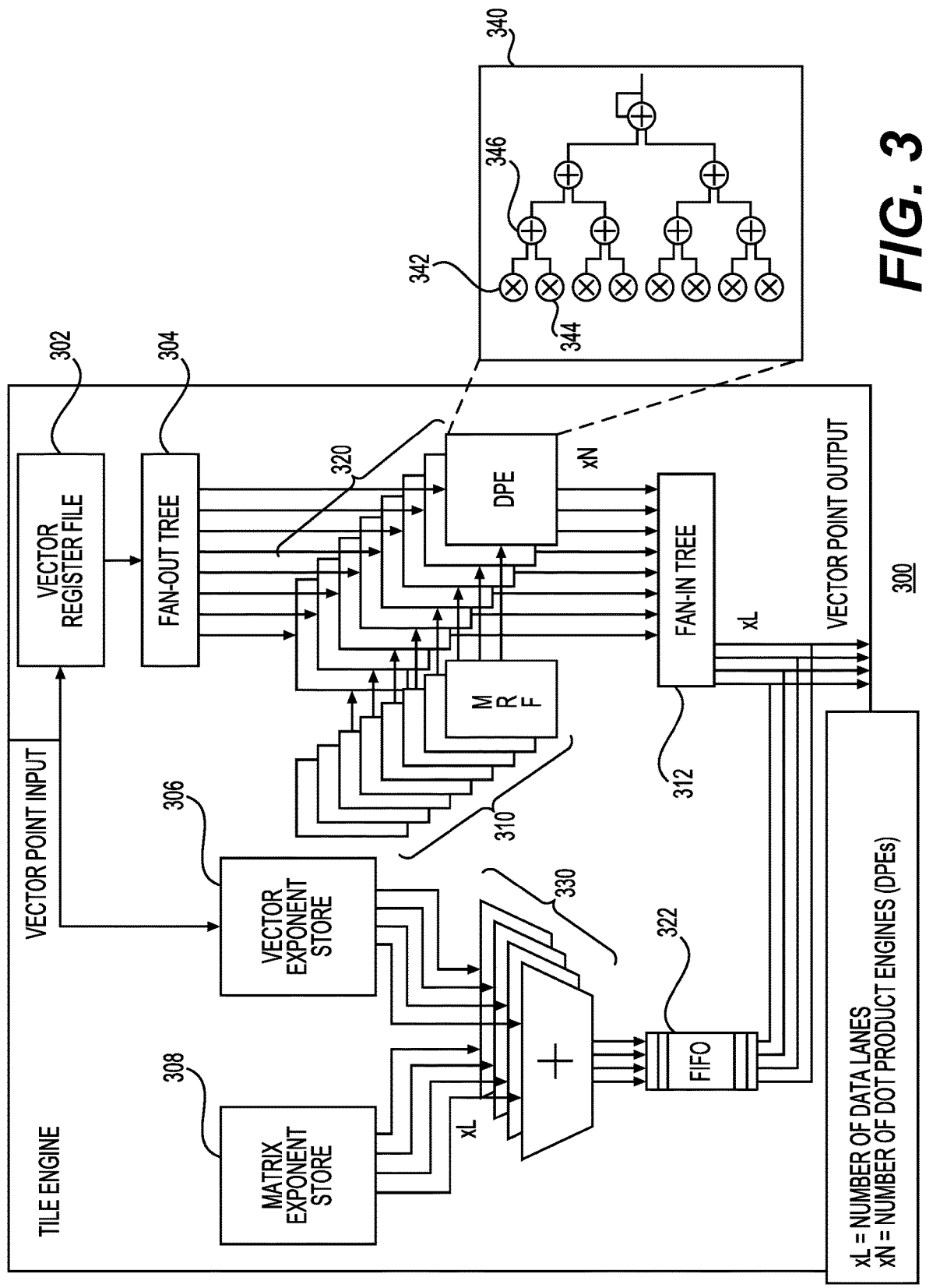
FIG. 3 is a block diagram of a tile engine in accordance with one example.

FIG. 3 is a block diagram of a tile engine 300 in accordance with one example. Tile engine 300 may include a vector register file 302, which may store vector data. Vector data from vector register file 302 may be coupled to a fan-out tree 304, which may provide vector data to dot product units (e.g., DPEs 320) in parallel. In this example, each of the N DPEs may receive vector data in parallel. Each of the dot product units may receive the matrix data from matrix register files (MRFs) 310. The DPEs 320 may perform the dot product computation that corresponds to one native row in the matrix register file. The vector point input (in one example, expressed in the BFP format) may also be coupled to vector exponent store 306 and matrix exponent store 308. As described elsewhere, the exponent may be a shared exponent with the same bit width for both the vector data and the matrix data. The exponents may be summed and provided via elements 330 to FIFO queues 322. The exponents may be combined with the mantissa portions after they are received via fan-in tree 312. Example detail related to a dot product unit 340 is shown in FIG. 3. Each dot product unit (e.g., dot product unit 340) may include independent multipliers (e.g., 342 and 344) and accumulators (e.g., 346).

In certain examples of the present disclosure synthesis specialization techniques may be used to scale up the microarchitecture of neural network processor 100 for a given application. As an example, first, the numeric representation for the application at hand may be analyzed to determine how many multiply-accumulate resources are available. Second, the multiply-accumulate resources may be organized into matrix-vector multiplication structures based on the available parallelism in the application.

In one example, a neural network model corresponding to an application to be executed by the neural network processor may be analyzed to determine: (1) a first minimum number of bits required to express a shared exponent value required to satisfy a first precision requirement corresponding to a first native dimension of each of the matrix elements and corresponding to a second native dimension of each of the vector elements, (2) a second minimum number of bits required to express a first mantissa value required to satisfy a second precision requirement corresponding to the each of the matrix elements, and (3) a third minimum number of bits required to express a second mantissa value required to satisfy a third precision requirement corresponding to the each of the vector elements. In a specific example, the neural network model for the application may be analyzed and fine-tuned to determine the narrowest precision representation that can be used for each the vector and matrix values. Narrower precisions require fewer resources to implement, which in turn may advantageously allow more multiply-accumulate resources to be provisioned in a hardware node implementing the processor. In one example, neural network processor 100 may express numbers using a block floating point format where the block size is equal to the native dimension. Therefore, in this example, each native 1 by N vector has a shared exponent, and each row of an N by N matrix has a shared exponent. Each element in the block may have a B-bit two's complement mantissa, and the mantissa size for the vector ($B_V$) and matrix elements ($B_M$) can be different.

In some examples, the native dimension (N) may be the central synthesis parameter for specialization. Native vectors may have a size of 1 by N and native matrices may have a size of N by N, and all instructions for neural network processor 100 may operate only on native-sized data. Logical vectors and matrices in applications may often be larger than the native size; in these cases, the vectors and matrices may be broken up into native-sized tiles. Table 4 below shows a non-exhaustive list of synthesis parameters:

TABLE 4

N = Native dimension
$B_V$ = Vector element mantissa bits
$B_M$ = Matrix element mantissa bits
L = Lanes
T = Tile Engines
C = Channels
G = T/C = Group size Intra-tile column parallelism may exploit the fact that each multiplication within a row of an MVM (e.g., each dot product) is independent. In this example, the synthesis parameter Lanes (L) indicates the number of parallel multipliers that can process L-elements of vector and matrix input data that will result in a partial dot-product, as depicted in the top-right corner of FIG. 3. Lane parallelism may be exploited by the L-number of independent multipliers that are driven by a subset of the vector inputs (of size L) and matrix column inputs (of size L) for every clock cycle. The outputs of the multipliers may be connected to an add-reduction tree that handles partial accumulation of the L-element multiplier results. The add-reduction output result may then be connected to an accumulator that sums all partial results to achieve intra-row parallelism. In this example, the accumulator will emit a final dot-product result after N/L clock cycles.

Intra-tile row parallelism may exploit the fact that every row in an MVM (e.g., each dot product) is independent from the others. Each tile engine in the processor may be responsible for a matrix-vector multiplication of a vector and matrix of sizes equal to the native dimension (N). As explained earlier, within each tile engine the processor may instantiate an array of N dot product units, each of which may handle a row in the MVM operation. The dot product units may be lane-parallel, therefore each tile engine may compute N*L multiply-accumulate operations in parallel. Therefore, at the end of a single matrix-vector multiplication, a tile engine may produce a vector result of size N over N/L clock cycles. Dot product unit parallelism may be limited by the number of parallel dot products available in a native-sized MVM tile (e.g., N should not significantly exceed the dimensions of an application's logical matrices).

Figure 4:
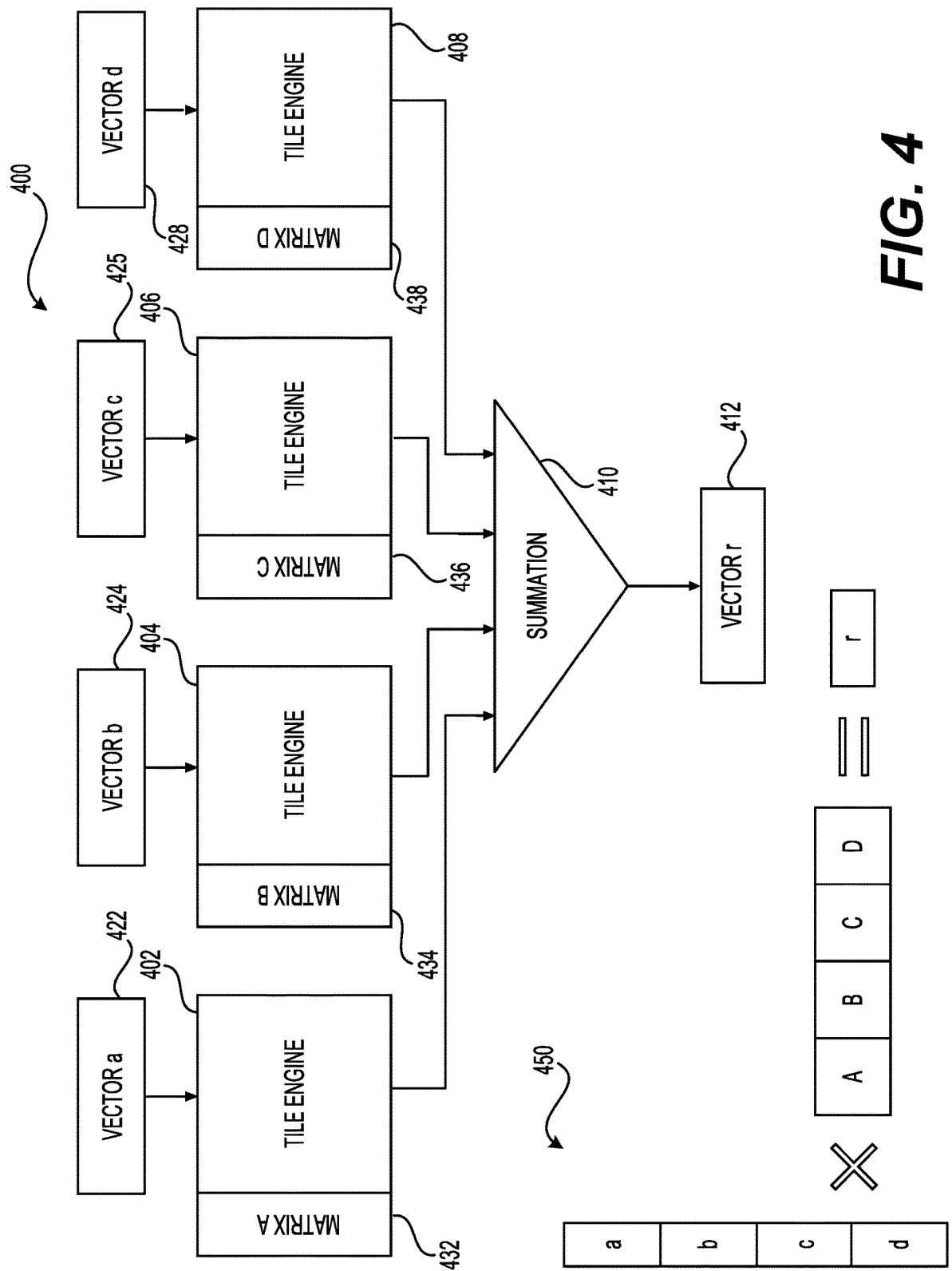
FIG. 4 is a block diagram showing a high-level view of inter-tile column parallelism specialized (ITCPS) architecture and the shape of matrix-vector multiplication accelerated by this specialization in accordance with one example.

Inter-tile column parallelism may exploit the fact that each column tile in a tiled MVM can be computed independently if the sub-results are then summed together. In accordance with one example, FIG. 4 is a block diagram showing a high-level view of inter-tile column parallelism specialized (ITCPS) architecture 400 and the shape 450 of matrix-vector multiplication accelerated by this specialization. As part of ITCPS architecture 400, tile engines (e.g., tile engines 402, 404, 406, and 408) may be grouped into groups of G engines by feeding the group's results to a summation 410. Thus, in this example, VECTOR a 422 may be multiplied with MATRIX A 432 using tile engine 402, VECTOR b 424 may be multiplied with MATRIX B 434 using tile engine 404, VECTOR c 426 may be multiplied with MATRIX C 436 using tile engine 406, and VECTOR d 428 may be multiplied with MATRIX D 438 using tile engine 408 and the results may be fed to summation 410, which may output VECTOR r 412. This synthesis specialization parameter (G=the number of tile engines grouped together) enables parallel evaluation of logical matrices that have column counts that are larger than N (the native dimension). Grouped tile engine parallelism may be limited in applications that have matrices with relatively few columns, such that usable G is not large.

Figure 5:
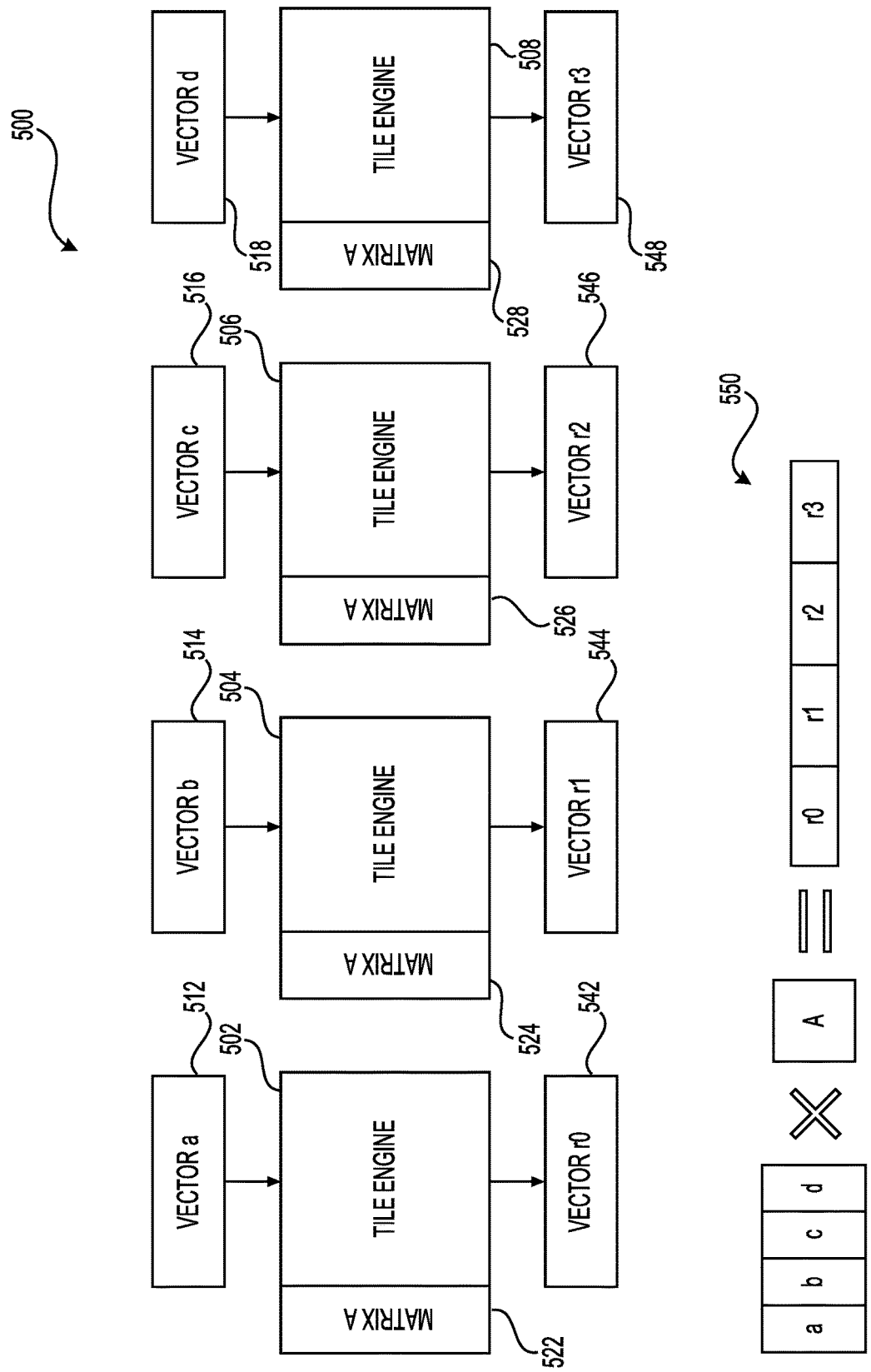
FIG. 5 is a block diagram showing a high-level view of vector-batch parallelism specialized (VBPS) architecture and the shape of matrix-vector multiplication accelerated by this specialization in accordance with one example.

Another synthesis specialization parameter may be related to the number of independent parallel channels (C) of tile engines in a matrix vector multiplier. This parameter may correspond to vector-batch parallelism, which may be useful in applications that have abundant independent vectors that need to be multiplied by the same matrix data. In this case, the neural network processor may instantiate parallel channels (C) of the tile engines and multifunction units that operate on different vectors, but on the same matrix data. In accordance with one example, FIG. 5 is a block diagram showing a high-level view of vector-batch parallelism specialized (VBPS) architecture 500 and the shape 550 of matrix-vector multiplication accelerated by this specialization. As part of VBPS architecture 500 tile engines (e.g., tile engines 502, 504, 506, and 508) may be configured in parallel channels (C) such that each channel may correspond to multiplication of a different vector data with the same matrix data. Thus, in this example, VECTOR a 512 may be multiplied with MATRIX A 522 using tile engine 502 and the result may be output as VECTOR r0 542; VECTOR b 514 may be multiplied with MATRIX A 524 using tile engine 504 and the result may be output as VECTOR r1 544; VECTOR c 516 may be multiplied with MATRIX A 526 using tile engine 506 and the result may be output as VECTOR r2 546; and VECTOR d 518 may be multiplied with MATRIX A 528 using tile engine 508 and the result may be output as VECTOR r3 548. As part of vector-batch parallelism, the neural network processor is turned into a matrix-matrix multiplication engine where the dimensions of the two matrices are N by C and N by N. As an example, with respect to using this type of parallelism for certain applications, one factor to consider would be that matrix-matrix parallelism is limited in applications that have relatively few independent vectors, such that usable C is not large.

Figure 6:
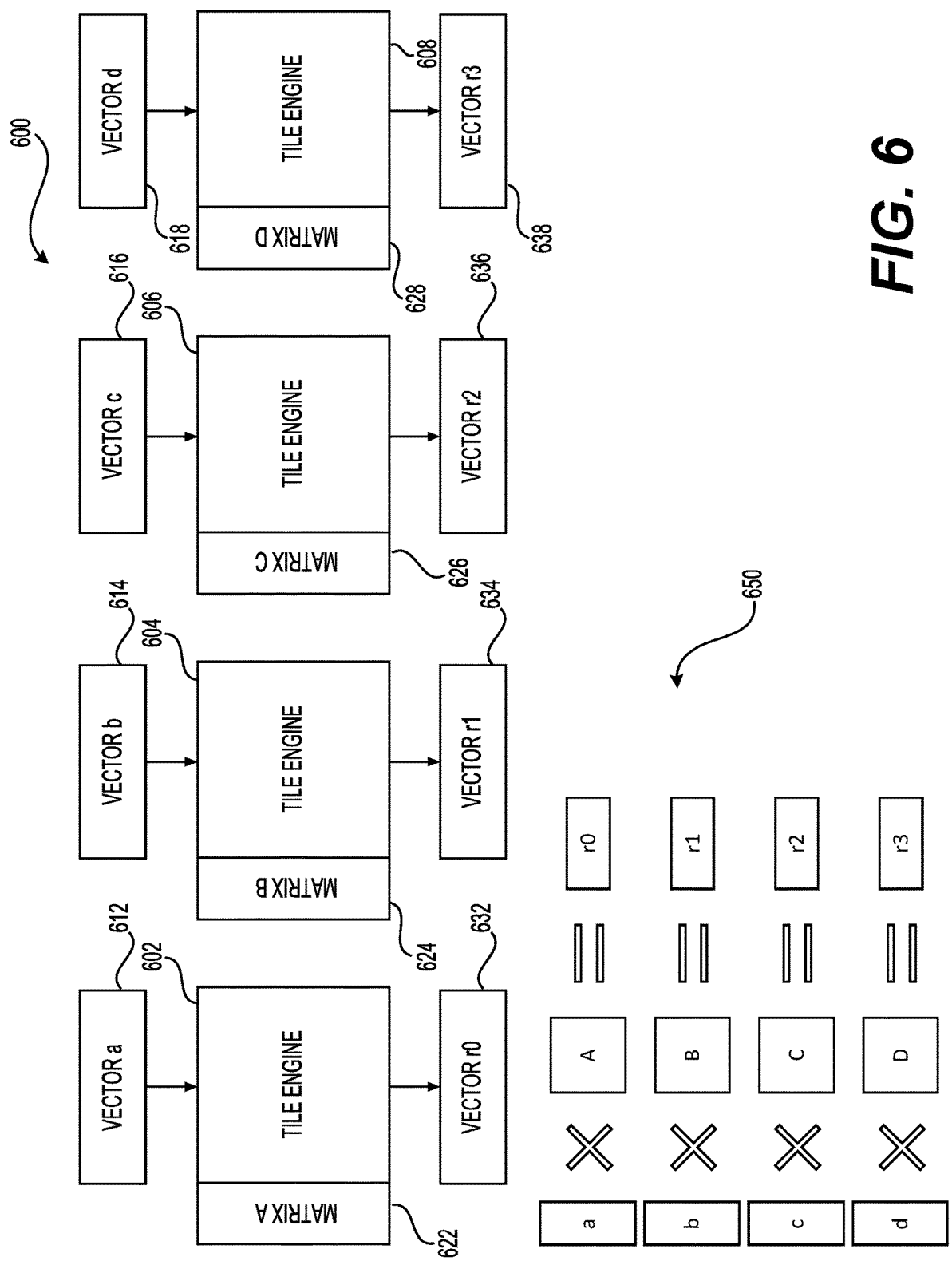
FIG. 6 is a block diagram showing a high-level view of independent engine parallelism specialized (IEPS) architecture and the shape of matrix-vector multiplication accelerated by this specialization in accordance with one example.

Yet another synthesis specialization parameter may be related to the independent engine parallelism, which operates on the principle that MVMs of completely different vectors and matrices are independent. A neural network processor can use this by instantiating parallel channels that operate on different matrix data. FIG. 6 is a block diagram showing a high-level view of independent engine parallelism specialized (IEPS) architecture 600 and the shape 650 of matrix-vector multiplication accelerated by this specialization in accordance with one example. As part of IEPS architecture 600 tile engines (e.g., tile engine 602, 604, 606, and 608) may be configured in parallel such that each tile engine may correspond to multiplication of different vector data with different matrix data. Thus, in this example, VECTOR a 612 may be multiplied with MATRIX A 622 using tile engine 602 and the result may be output as VECTOR r0 632; VECTOR b 614 may be multiplied with MATRIX B 624 using tile engine 604 and the result may be output as VECTOR r1 634; VECTOR c 616 may be multiplied with MATRIX C 626 using tile engine 606 and the result may be output as VECTOR r2 636; and VECTOR d 618 may be multiplied with MATRIX D 628 using tile engine 608 and the result may be output as VECTOR r3 638. Thus, in this way, these fully independent tile engines can be used for independent MVMs, MVM of a single native vector by a matrix of many native row tiles, or matrix-matrix multiplication. Independent engine parallelism may be most limited by the resource costs involved in deploying it, as compared with the vector-batch parallelism.

Figure 7:
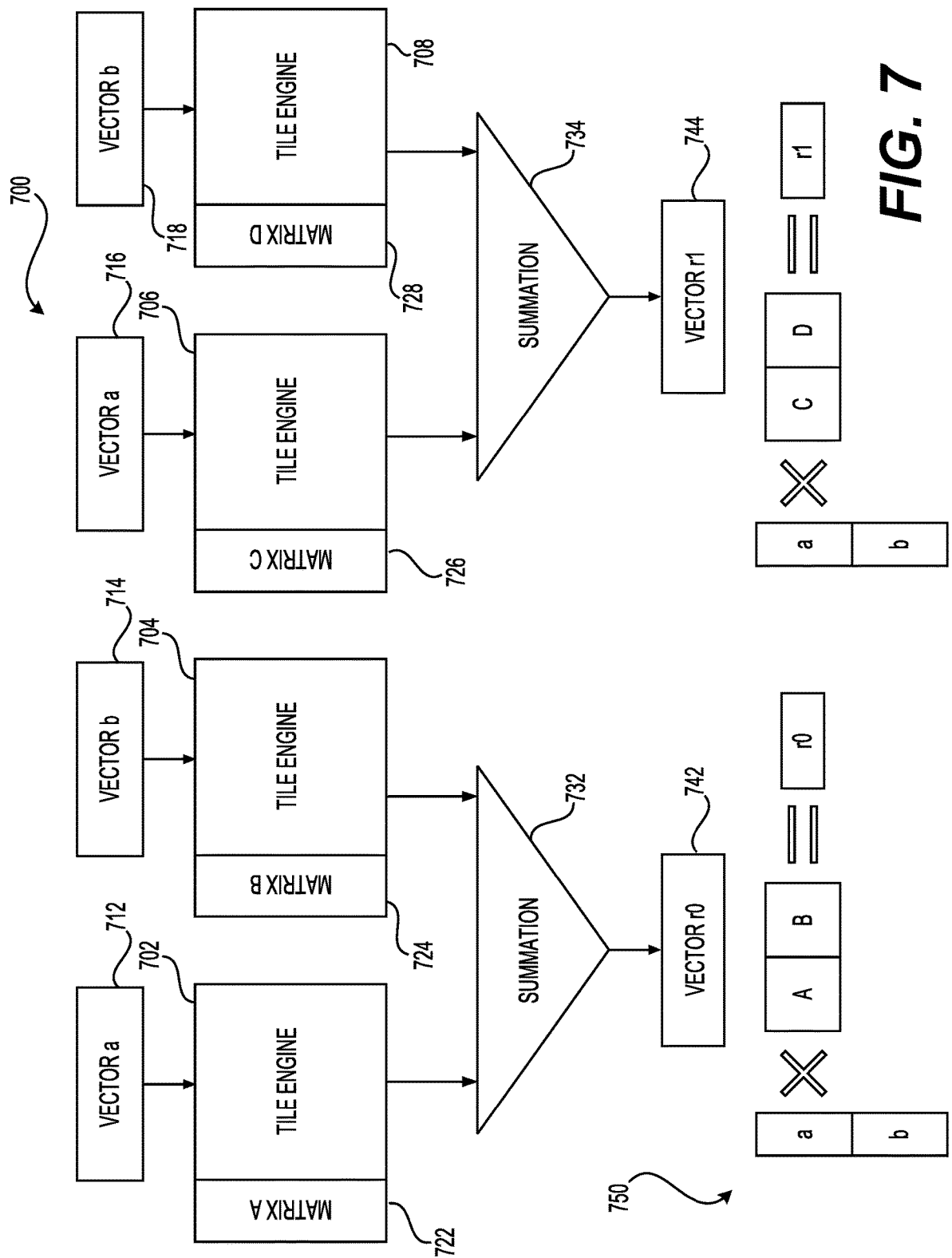
FIG. 7 depicts an intermediate architecture and the shape of computation that mixes grouped tile engines in accordance with one example.

Mixing engine parallelization strategies can be productive when an application has characteristics that are intermediate between the ideals for inter-tile row parallelism and inter-tile column parallelism. For example, an application may have a moderate number (e.g., 2) of moderately sized matrices (e.g., 2N by 2N). In accordance with one example, FIG. 7 depicts an intermediate architecture 700 and the shape of computation 750 that mixes grouped tile engines (G=2) with channels (C=2) to produce a neural network processor that can process an entire 2N by 2N matrix at once, or two N by 2N matrices in parallel. As part of architecture 700 a subset of tile engines (e.g., tile engines 702 and 704) may grouped into groups of (G=2) engines by feeding the group's results to a summation 732. Another subset of tile engines (e.g., 706 and 708) may be grouped into groups of (G=2) engines by feeding the group's results to a summation 734. Thus, in this example, VECTOR a 712 may be multiplied with MATRIX A 722 using tile engine 702 and VECTOR b 714 may be multiplied with MATRIX B 724 using tile engine 704 and the results may be fed to summation 732, which may output VECTOR r0 742. Similarly, VECTOR a 716 may be multiplied with MATRIX C 726 using tile engine 706, and VECTOR b 718 may be multiplied with MATRIX D 728 using tile engine 708 and the results may be fed to summation 734, which may output VECTOR r1 744. Additional resource savings can be gained by forcing all channels to use the same logical vector, or each channel can receive a unique vector.

Figure 8:
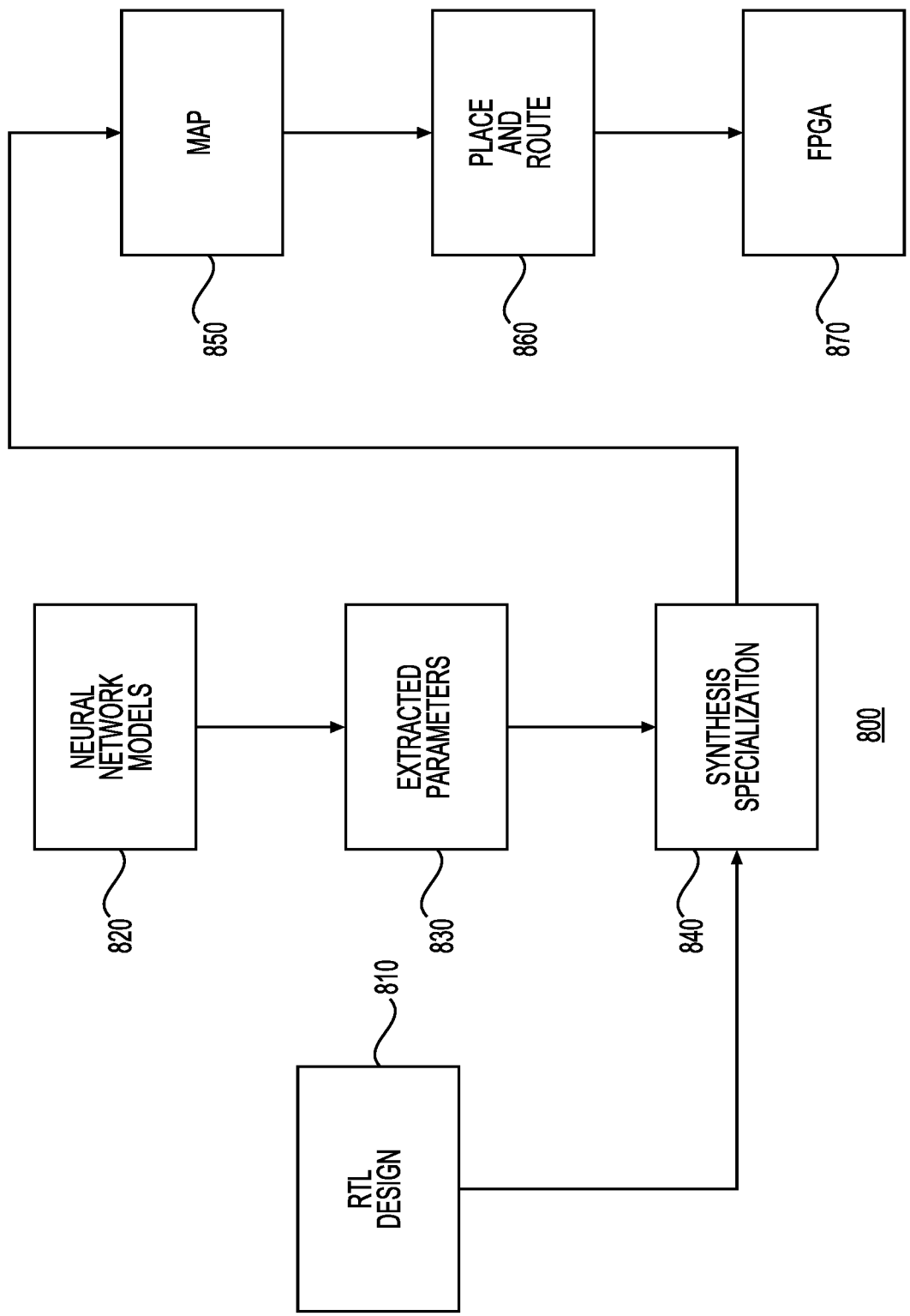
FIG. 8 is a diagram showing at a high-level the various components that may be used for configuring neural network processors with FPGAs to execute specific neural network models in accordance with one example.

FIG. 8 is a diagram 800 showing at a high-level the various components that may be used for configuring neural network processors with FPGAs to execute specific neural network models (e.g., specific CNN, RNN, or other types of neural network models with various types of layers). A hardware description language-based design of the FPGA, such as a register-transfer level (RTL) design 810 may be subjected to synthesis specialization 840 based on extracted parameters 830 derived from neural network models 820. The synthesis-specialized code may then be processed using a map tool 850 and a place and route tool 860 to generate a modified version of the code for the FPGA-based neural network processor 870.

Figure 9:
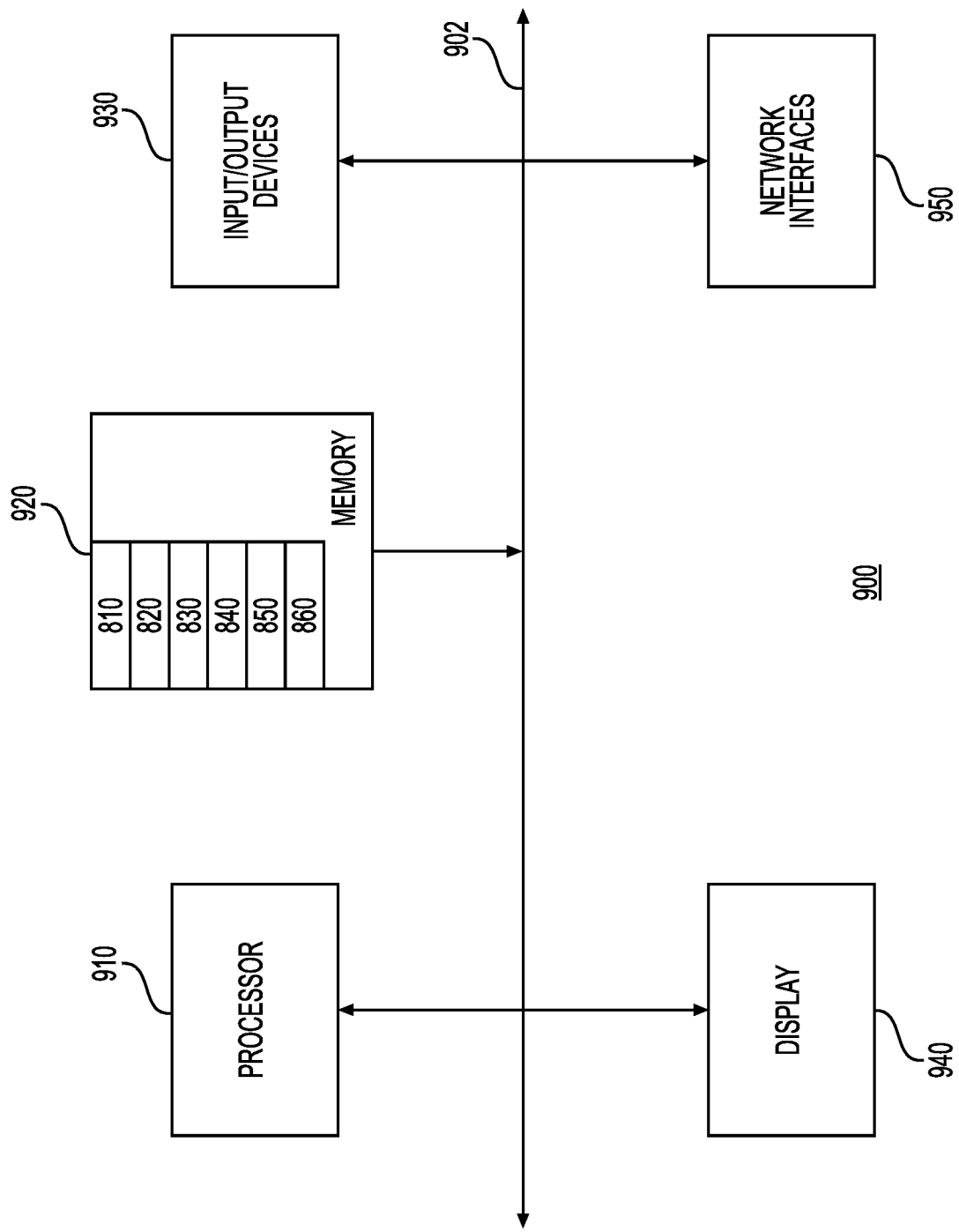
FIG. 9 shows a system for synthesizing a neural network processor comprising a plurality of tile engines in accordance with one example.

FIG. 9 shows a system 900 for synthesizing a neural network processor comprising a plurality of tile engines. System 900 may include a processor 910, a memory 920, input/output devices 930, display 940, and network interfaces 950 interconnected via bus system 902. Memory 920 may include register-transfer level (RTL) design 810, which may correspond to code representative of at least a portion of a hardware node (e.g., an FPGA) for implementing a neural network processor. Memory 920 may further include neural network models 820, extracted parameters 830, synthesis specialization 840, map tool 850, place and route tool 860. Synthesis specialization 840, when executed by processor 910 may be used to customize the neural network processor code for evaluating specific types of neural network models. Synthesis specialized code may then be used to map the components when map tool 850 is executed by processor 910. Although FIG. 9 shows a certain number of components of system 900 arranged in a certain way, additional or fewer components arranged differently may also be used.

Figure 10:
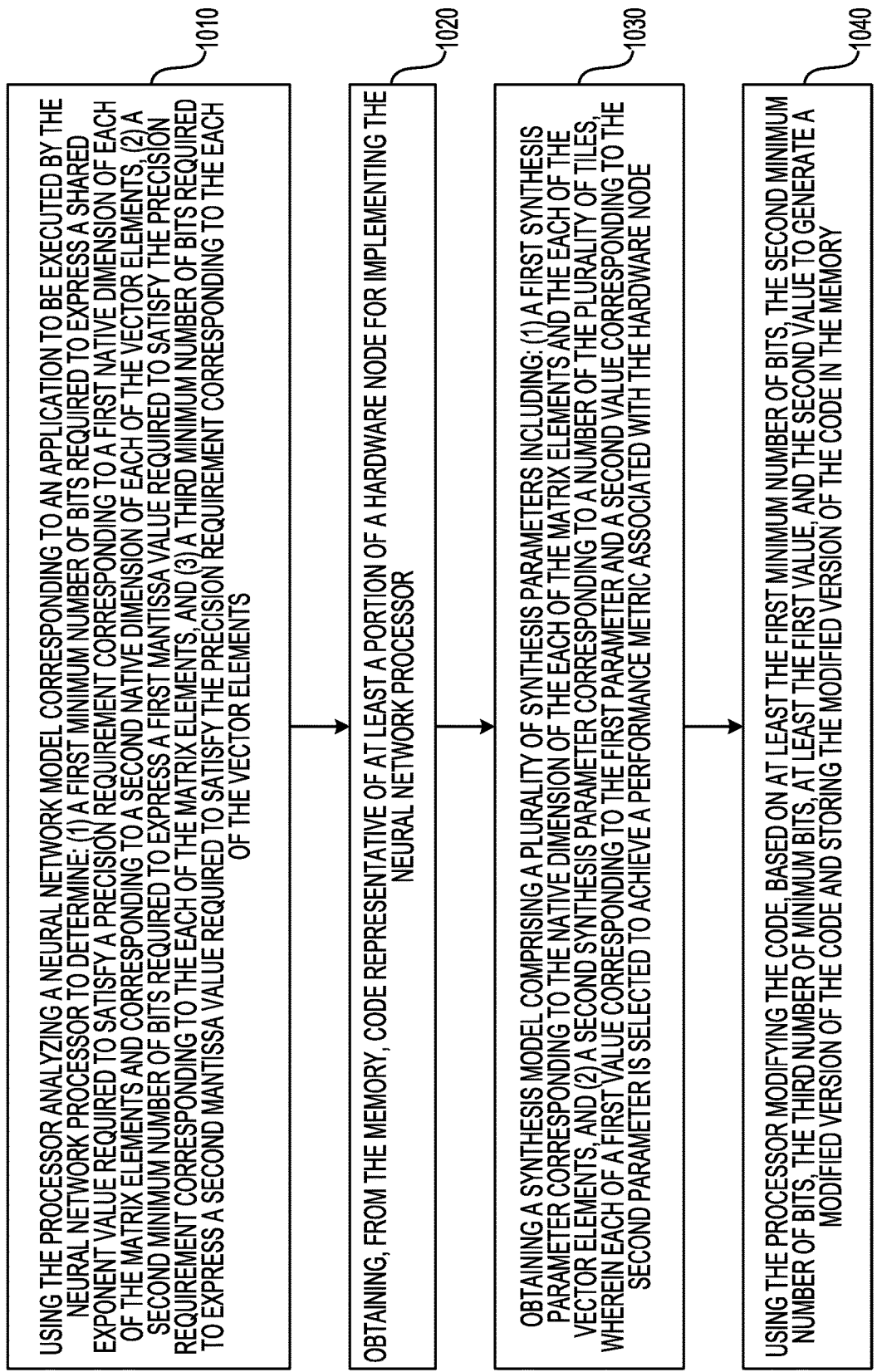
FIG. 10 shows a flow diagram of a method for synthesizing a neural network processor comprising a plurality of tile engines in accordance with one example.

FIG. 10 shows a flow diagram of a method for synthesizing a neural network processor comprising a plurality of tile engines, where each of the plurality of tile engines is configured to process matrix elements and vector elements. Step 1010 may include using the processor analyzing a neural network model corresponding to an application to determine: (1) a first minimum number of units required to express a shared exponent value required to satisfy a first precision requirement corresponding to each of the matrix elements and corresponding to each of the vector elements, (2) a second minimum number of units required to express a first mantissa value required to satisfy a second precision requirement corresponding to the each of the matrix elements, and (3) a third minimum number of units required to express a second mantissa value required to satisfy a third precision requirement corresponding to the each of the vector elements. In one example, the shared exponent value and the mantissas may correspond to a block floating point (BFP) format. In certain examples, using a narrow form of BFP, mantissas could be trimmed to as low as 2-3 bits without negatively impacting the accuracy of model training of deep neural networks (DNN) models and large ImageNet models (e.g., ResNet-50). In certain examples, as part of the synthesis specialization for FPGA-based neural network processors, narrow precision may be further exploited. As an example, by packing 2 or 3 bit multiplications into DSP blocks combined with soft logic instantiations may permit the deployment of a large number of multiply-accumulate (MAC) units on an FPGA.

Step 1020 may include obtaining code representative of at least a portion of at least one hardware node for implementing the neural network processor. In one example, the code may be register transfer-level (RTL) code for at least one FPGA that may be used to implement the neural network processor.

Step 1030 may include obtaining a synthesis model comprising a plurality of synthesis specialization parameters including: (1) a first synthesis specialization parameter corresponding to a first native dimension of the each of the matrix elements and, (2) a second synthesis specialization parameter corresponding to a second native dimension of the each of the vector elements, and (3) a third synthesis specialization parameter corresponding to a number of the plurality of tile engines, where each of a first value corresponding to the first synthesis specialization parameter, a second value corresponding to the second synthesis specialization parameter, and a third value corresponding to the third synthesis specialization parameter is selected to meet or exceed a performance metric associated with the at least one hardware node. In this example, the block size of the BFP format data may be equal to the native dimension. Therefore, each native 1 by N vector may have a shared exponent, and each row of an N by N matrix may have a shared exponent. Each of the vector data and the matrix data may have a two's complement mantissa portion, and the mantissa size for the vector data and the matrix data may be different.

In one example, the hardware node may be implemented using at least one FPGA that may include adaptive logic modules, digital signal processors, and random-access memories (e.g., BRAMs). In this example, the performance metric may relate to an area required to implement the adaptive logic modules, digital signal processors, and random-access memories (e.g., BRAMs) as part of the at least one FPGA. In one example, the area required to implement these FGPA portions may be a function of the area of the tile engines, the vector register file, the matrix register files, and other components of a neural network processor, such as the ones described earlier. In one example, the performance metric may correspond to a total tile area of each of the plurality of tile engines, which may be computed based on the equation and the variables shown in Table 5 below:

TABLE 5

Total Tile Area = $C \times N \times L \times A_{mult}(B_a, B_w)$, where C = Number of Channels; N = Native Dimension; L = Number of Lanes; $A_{mult}$ = Total area of a matrix-vector multiplier; $B_a$ = Bit-width of activations; and $B_w$ = Bit width of data elements (e.g., the number of bits in a word when a word is the data element).

Thus, as an example, Table 6 below shows various possible configurations of a hardware node (e.g., an FPGA) that may be used to implement a neural network processor and the corresponding approximate numbers of adaptive logic modules (ALMs), random-access memories (RAMs), and digital signal processors (DSPs).

TABLE 6

| Device | Native Dimension | Lanes | MVMs | ALMs | RAMs | DSPs |
| --- | --- | --- | --- | --- | --- | --- |
| D1 | 100 | 10 | 1000 | 99000 | 920 | 528 |
| D2 | 100 | 10 | 3000 | 155000 | 1980 | 1500 |
| D3 | 200 | 10 | 6000 | 140000 | 1800 | 1200 |
| D4 | 100 | 10 | 6000 | 140000 | 1800 | 1200 |

When the hardware node is implemented using a specific FPGA (e.g., Stratix), the performance metric related to the area may further be evaluated using information provided by the supplier of the FPGA.

Step 1040 may include using the processor modifying the code, based on at least the first minimum number of units, the second minimum number of units, the third minimum number of units and at least the first value and the second value, to generate a modified version of the code and storing a modified version of the code. As part of this step, in one example, the code representative of the at least one portion of the FPGA may be modified such that the FPGA is now synthesis-specialized corresponding to a neural network processor is tailored to provide inference related to a specific application, such as an image classification application.

Although FIG. 10 describes a certain number of steps performed in a certain order, additional or fewer steps in a different order may be performed. As an example, as part of step 1030 other synthesis models including other synthesis specialization parameters may be obtained. Thus, in one example, this step may include obtaining a synthesis model comprising a plurality of synthesis specialization parameters including: (1) a first synthesis specialization parameter corresponding to whether the matrix register file is private to each one of the plurality of tile engines or whether the matrix register file is shared among the plurality of tile engines and (2) a second synthesis specialization parameter corresponding to whether each of the plurality of dot product units comprises an add-reduction tree. Indeed, many different synthesis models may be constructed and used as part of the synthesis specialization of the at least one hardware node. In addition, although these steps include examples related to an FPGA, other types of hardware nodes may also be synthesis specialized. As an example, any type of hardware that could be configured based on similar synthesis specialization parameters could be processed using similar steps as described with respect to the FPGA example.

In conclusion, the present disclosure relates to a method, implemented by a processor, for synthesizing a neural network processor comprising a plurality of tile engines, where each of the plurality of tile engines is configured to process matrix elements and vector elements. The method may include using the processor analyzing a neural network model corresponding to an application to determine: (1) a first minimum number of units required to express a shared exponent value required to satisfy a first precision requirement corresponding to each of the matrix elements and corresponding to each of the vector elements, (2) a second minimum number of units required to express a first mantissa value required to satisfy a second precision requirement corresponding to the each of the matrix elements, and (3) a third minimum number of units required to express a second mantissa value required to satisfy a third precision requirement corresponding to the each of the vector elements.

The method may further include obtaining code representative of at least a portion of at least one hardware node for implementing the neural network processor. The method may further include obtaining a synthesis model comprising a plurality of synthesis specialization parameters including: (1) a first synthesis specialization parameter corresponding to a first native dimension of the each of the matrix elements, (2) a second synthesis specialization parameter corresponding to a second native dimension of the each of the vector elements, and (3) a third synthesis specialization parameter corresponding to a number of the plurality of tile engines, where each of a first value corresponding to the first synthesis specialization parameter, a second value corresponding to the second synthesis specialization parameter, and a third value corresponding to the third synthesis specialization parameter is selected to meet or exceed a performance metric associated with the at least one hardware node.

The method may further include using the processor modifying the code, based on at least the first minimum number of units, the second minimum number of units, the third minimum number of units and at least the first value and the second value, to generate a modified version of the code and storing a modified version of the code.

The synthesis specialization parameters may further comprise a fourth synthesis specialization parameter corresponding to a number of parallel multipliers that can process the matrix elements and the vector elements to produce a partial dot-product. The synthesis specialization parameters may further comprise a fifth synthesis specialization parameter corresponding to a number of independent parallel channels of the plurality of tile engines. The synthesis specialization parameters may further comprise a sixth synthesis specialization parameter corresponding to a number of groups, where each of the groups has a group size equal to the number of the plurality of tile engines divided by the number of the independent parallel channels.

In this example, the hardware node may comprise a field programmable gate array (FPGA) including adaptive logic modules, digital signal processors, and random-access memories, and the performance metric may correspond to an area required to implement the adaptive logic modules, the digital signal processors, and the random-access memories as part of the FPGA.

The tile engines may include dot product units and where each of the dot product units may be configured to receive the matrix elements from a matrix register file, and where the synthesis specialization parameters may further comprise an eighth synthesis specialization parameter corresponding to whether the matrix register file is private to each one of the plurality of tile engines or whether the matrix register file is shared among the plurality of tile engines. In another example, the tile engines may include dot product units and where each of the dot product units and the synthesis specialization parameters may further comprise a ninth synthesis specialization parameter corresponding to whether each of the plurality of dot product units comprises an add-reduction tree.

In another example, the present disclosure relates to a system comprising a processor and a memory comprising: (1) code representative of at least a portion of at least one hardware node for implementing the neural network processor comprising a plurality of tile engines, where each of the plurality of tile engines is configured to process matrix elements and vector elements, (2) a synthesis model comprising a plurality of synthesis specialization parameters including: (a) a first synthesis specialization parameter corresponding to a first native dimension of the each of the matrix elements and, (b) a second synthesis specialization parameter corresponding to a second native dimension of the each of the vector elements, and (c) a third synthesis specialization parameter corresponding to a number of the plurality of tile engines, where each of a first value corresponding to the first synthesis specialization parameter, a second value corresponding to the second synthesis specialization parameter, and a third value corresponding to the third synthesis specialization parameter is selected to meet or exceed a performance metric associated with the at least one hardware node, and (3) instructions for synthesizing a neural network processor comprising a plurality of tile engines, where each of the plurality of tile engines is configured to process matrix elements and vector elements.

The instructions may be configured to using the processor analyze a neural network model corresponding to an application to determine: (1) a first minimum number of units required to express a shared exponent value required to satisfy a first precision requirement corresponding to each of the matrix elements and corresponding each of the vector elements, (2) a second minimum number of units required to express a first mantissa value required to satisfy a second precision requirement corresponding to the each of the matrix elements, and (3) a third minimum number of units required to express a second mantissa value required to satisfy a third precision requirement corresponding to the each of the vector elements.

The instructions may further be configured to using the processor modify the code, based on at least the first minimum number of units, the second minimum number of units, the third minimum number of units and at least the first value, the second value, and the third value, to generate a modified version of the code and store a modified version of the code.

The synthesis specialization parameters may further comprise a fourth synthesis specialization parameter corresponding to a number of parallel multipliers that can process the matrix elements and the vector elements to produce a partial dot-product. The synthesis specialization parameters may further comprise a fifth synthesis specialization parameter corresponding to a number of independent parallel channels of the plurality of tile engines. The synthesis specialization parameters may further comprise a sixth synthesis specialization parameter corresponding to a number of groups, where each of the groups has a group size equal to the number of the plurality of tile engines divided by the number of the independent parallel channels.

In this example, the hardware node may comprise a field programmable gate array (FPGA) including adaptive logic modules, digital signal processors, and random-access memories, and the performance metric may correspond to an area required to implement the adaptive logic modules, the digital signal processors, and the random-access memories as part of the FPGA.

The tile engines may include dot product units and where each of the dot product units may be configured to receive the matrix elements from a matrix register file, and where the synthesis specialization parameters may further comprise an eighth synthesis specialization parameter corresponding to whether the matrix register file is private to each one of the plurality of tile engines or whether the matrix register file is shared among the plurality of tile engines. In another example, the tile engines may include dot product units and where each of the dot product units and the synthesis specialization parameters may further comprise a ninth synthesis specialization parameter corresponding to whether each of the plurality of dot product units comprises an add-reduction tree.

In yet another example, the present disclosure relates to a method for synthesizing a neural network processor comprising a plurality of tile engines, where each of the plurality of tile engines is configured to process matrix elements and vector elements, and where each of the plurality of tile engines comprises a plurality of dot product units and where each of the dot product units is configured to receive the matrix elements from a matrix register file.

The method may include using the processor analyzing a neural network model corresponding to an application to determine: (1) a first minimum number of units required to express a shared exponent value required to satisfy a first precision requirement corresponding to each of the matrix elements and corresponding to each of the vector elements, (2) a second minimum number of units required to express a first mantissa value required to satisfy a second precision requirement corresponding to the each of the matrix elements, and (3) a third minimum number of units required to express a second mantissa value required to satisfy a third precision requirement corresponding to the each of the vector elements.

The method may further include obtaining code representative of at least a portion of at least one hardware node for implementing the neural network processor. The method may further include obtaining a synthesis model comprising a plurality of synthesis specialization parameters including: (1) a first synthesis specialization parameter corresponding to whether the matrix register file is private to each one of the plurality of tile engines or whether the matrix register file is shared among the plurality of tile engines and (2) a second synthesis specialization parameter corresponding to whether each of the plurality of dot product units comprises an add-reduction tree.

The method may further include using the processor modifying the code, based on at least the first minimum number of units, the second minimum number of units, the third minimum number of units and at least the first synthesis specialization parameter and the second synthesis specialization parameter, and storing a modified version of the code.

The synthesis specialization parameters may further comprise a third synthesis specialization parameter corresponding to a number of parallel multipliers that can process the matrix elements and the vector elements to produce a partial dot-product. The synthesis specialization parameters may further comprise a fourth synthesis specialization parameter corresponding to a number of independent parallel channels of the plurality of tile engines. The synthesis specialization parameters may further comprise a fifth synthesis specialization parameter corresponding to a number of groups, where each of the groups has a group size equal to the number of the plurality of tile engines divided by the number of the independent parallel channels of the plurality of tile engines.

In this example, the hardware node may comprise a field programmable gate array (FPGA) including adaptive logic modules, digital signal processors, and random-access memories, and the performance metric may correspond to an area required to implement the adaptive logic modules, the digital signal processors, and the random-access memories as part of the FPGA. In this example, the performance metric may correspond to an area required to implement each of the plurality of tile engines It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method, implemented by a processor, for synthesizing a neural network processor comprising a pipeline for processing instructions, the pipeline including a matrix vector unit, a first multifunction unit, wherein the first multifunction unit is connected to receive an input from the matrix vector unit, a second multifunction unit, wherein the second multifunction unit is connected to receive an output from the first multifunction unit, wherein the matrix vector unit comprises a plurality of tile engines, wherein each of the plurality of tile engines is configured to process matrix elements and vector elements, and wherein each of the plurality of tile engines comprises a plurality of dot product units and wherein each of the plurality of dot product units is configured to receive the matrix elements from a matrix register file, the method comprising:

using the processor analyzing a neural network model corresponding to an application to determine a precision requirement corresponding to each of the matrix elements expressed in a block floating point (BFP) format and corresponding to each of the vector elements expressed in the BFP format;

obtaining code representative of at least a portion of at least one hardware node for implementing the neural network processor;

obtaining a synthesis model comprising a plurality of synthesis specialization parameters including: (1) a first synthesis specialization parameter corresponding to a first native dimension of the each of the matrix elements, (2) a second synthesis specialization parameter corresponding to a second native dimension of the each of the vector elements, and (3) a third synthesis specialization parameter corresponding to a number of the plurality of the engines; wherein each of a first value corresponding to the first synthesis specialization parameter, a second value corresponding to the second synthesis specialization parameter, and a third value corresponding to the third synthesis specialization parameter is selected to meet or exceed a performance metric associated with the at least one hardware node, and wherein each of the first native dimension of the each of the matrix elements and the second native dimension of the each of the vector elements is selected to be equal to a block size of the BFP format and wherein the plurality of synthesis specialization parameters further comprises a fourth synthesis specialization parameter corresponding to whether each of the plurality of dot product units comprises an add-reduction tree; and using the processor modifying the code; based on at least the first value corresponding to the first synthesis specialization parameter, the second value corresponding to the second synthesis specialization parameter, the third value corresponding to the third synthesis specialization parameter, and a determination regarding inclusion of the add-reduction tree based on the fourth synthesis specialization parameter to generate a modified version of the code and storing a modified version of the code.

2. The method of claim 1, wherein the plurality of synthesis specialization parameters further comprises a fourth synthesis specialization parameter corresponding to a number of parallel multipliers that can process the matrix elements and the vector elements to produce a partial dot-product.

3. The method of claim 2, wherein the plurality of synthesis specialization parameters further comprises a fifth synthesis specialization parameter corresponding to a number of independent parallel channels of the plurality of tile engines.

4. The method of claim 3, wherein the plurality of synthesis specialization parameters further comprises a sixth synthesis specialization parameter corresponding to a number of groups, wherein each of the groups has a group size equal to the number of the plurality of tile engines divided by the number of the independent parallel channels.

5. The method of claim 1, wherein the at least one hardware node comprises a field programmable gate array (FPGA) including adaptive logic modules, digital signal processors, and random-access memories, and wherein the performance metric corresponds to an area required to implement the adaptive logic modules, the digital signal processors, and the random-access memories as part of the FPGA.

6. The method of claim 1, wherein the plurality of synthesis specialization parameters further comprises a seventh synthesis specialization parameter corresponding to whether the matrix register file is private to each one of the plurality of tile engines or whether the matrix register file is shared among the plurality of tile engines.

7. The method of claim 1, wherein the performance metric corresponds to an area required to implement each of the plurality of the engines.

8. A system comprising:
a processor; and
a memory comprising: (1) code representative of at least a portion of at least one hardware node for implementing the neural network processor comprising a pipeline for processing instructions, the pipeline including a matrix vector unit, a first multifunction unit, wherein the first multifunction unit is connected to receive an input from the matrix vector unit, a second multifunction unit, wherein the second multifunction unit is connected to receive an output from the first multifunction unit, wherein the matrix vector unit comprises a plurality of tile engines, wherein each of the plurality of tile engines is configured to process matrix elements and vector elements, and wherein each of the plurality of tile engines comprises a plurality of dot product units and wherein each of the plurality of dot product units is configured to receive the matrix elements from a matrix register file, (2) a synthesis model comprising a plurality of synthesis specialization parameters including: (a) a first synthesis specialization parameter corresponding to a first native dimension of the each of the matrix elements and, (b) a second synthesis specialization parameter corresponding to a second native dimension of the each of the vector elements, (c) a third synthesis specialization parameter corresponding to a number of the plurality of tile engines, wherein each of a first value corresponding to the first synthesis specialization parameter, a second value corresponding to the second synthesis specialization parameter, and a third value corresponding to the third synthesis specialization parameter is selected to meet or exceed a performance metric associated with the at least one hardware node, and (d) a fourth synthesis specialization parameter corresponding to whether each of the plurality of dot product units comprises an add-reduction tree, and (3) instructions for synthesizing the neural network processor, the instructions configured to:
using the processor, analyze a neural network model corresponding to an application to determine a precision requirement corresponding to each of the matrix elements expressed in a block floating point (BFP) format and corresponding to each of the vector elements expressed in the BFP format, and wherein each of the first native dimension of the each of the matrix elements and the second native dimension of the each of the vector elements is selected to be equal to a block size of the BFP format,
using the processor modify the code, based on at least the first value corresponding to the first synthesis specialization parameter, the second value corresponding to the second synthesis specialization parameter, the third value corresponding to the third synthesis specialization parameter, and a determination regarding inclusion of the add-reduction tree based on the fourth synthesis specialization parameter, to generate a modified version of the code and store a modified version of the code.

9. The system of claim 8, wherein the plurality of synthesis specialization parameters further comprises a fourth fifth synthesis specialization parameter corresponding to a number of parallel multipliers that can process the matrix elements and the vector elements to produce a partial dot-product.

10. The system of claim 9, wherein the plurality of synthesis specialization parameters further comprises a sixth synthesis specialization parameter corresponding to a number of independent parallel channels of the plurality of tile engines.

11. The system of claim 10, wherein the plurality of synthesis specialization parameters further comprises a seventh synthesis specialization parameter corresponding to a number of groups, wherein each of the groups has a group size equal to the number of the plurality of the engines divided by the number of the independent parallel channels.

12. The system of claim 8, wherein the at least one hardware node comprises a field programmable gate array (FPGA) including adaptive logic modules, digital signal processors, and random-access memories, and wherein the performance metric corresponds to an area required to implement the adaptive logic modules, the digital signal processors, and the random-access memories as part of the FPGA.

13. The system of claim 8, wherein the plurality of synthesis specialization parameters further comprises an eighth synthesis specialization parameter corresponding to whether the matrix register file is private to each one of the plurality of tile engines or whether the matrix register file is shared among the plurality of tile engines.

14. A method, implemented by a processor, for synthesizing a neural network processor comprising a pipeline for processing instructions, the pipeline including a matrix vector unit, a first multifunction unit, wherein the first multifunction unit is connected to receive an input from the matrix vector unit, a second multifunction unit, wherein the second multifunction unit is connected to receive an output from the first multifunction unit, wherein the matrix vector unit comprises a plurality of tile engines, wherein each of the plurality of the engines is configured to process matrix elements and vector elements, and wherein each of the plurality of the engines comprises a plurality of dot product units and wherein each of the dot product units is configured to receive the matrix elements from a matrix register file, the method comprising:
using the processor analyzing a neural network model corresponding to an application to determine a precision requirement corresponding to each of the matrix elements expressed in a block floating point (BFP) format and corresponding to each of the vector elements expressed in the BFP format;
obtaining code representative of at least a portion of at least one hardware node for implementing the neural network processor;
obtaining a synthesis model comprising a plurality of synthesis specialization parameters including: (1) a first synthesis specialization parameter corresponding to whether the matrix register file is private to each one of the plurality of tile engines or whether the matrix register file is shared among the plurality of tile engines, (2) a second synthesis specialization parameter corresponding to whether each of the plurality of dot product units comprises an add-reduction tree, (3) a third synthesis specialization parameter corresponding to a first native dimension of the each of the matrix elements, and (4) a fourth synthesis specialization parameter corresponding to a second native dimension of the each of the vector elements, and wherein each of the first native dimension of the each of the matrix elements and the second native dimension of the each of the vector elements is selected to be equal to a block size of the BFP format; and using the processor modifying the code, based on at least the second synthesis specialization parameter, the third synthesis specialization factor, and the fourth synthesis specialization factor, and storing a modified version of the code.

15. The method of claim 14, wherein the plurality of synthesis specialization parameters further comprises a fifth synthesis specialization parameter corresponding to a number of parallel multipliers that can process the matrix elements and the vector elements to produce a partial dot-product.

16. The method of claim 15, wherein the plurality of synthesis specialization parameters further comprises a sixth synthesis specialization parameter corresponding to a number of independent parallel channels of the plurality of tile engines.

17. The method of claim 16, wherein the plurality of synthesis specialization parameters further comprises a seventh synthesis specialization parameter corresponding to a number of groups, wherein each of the groups has a group size equal to the number of the plurality of tile engines divided by the number of the independent parallel channels of the plurality of tile engines.

18. The method of claim 14, wherein the at least one hardware node comprises a field programmable gate array (FPGA) including adaptive logic modules, digital signal processors, and random-access memories.

* * * * *